(12) United States Patent
Siddavanahalli

(10) Patent No.: US 9,311,734 B1
(45) Date of Patent: Apr. 12, 2016

(54) ADJUSTING A DIGITAL IMAGE CHARACTERISTIC OF AN OBJECT IN A DIGITAL IMAGE

(75) Inventor: Vinay Siddavanahalli, Mountain View, CA (US)

(73) Assignee: Google Inc., Mountain View, CA (US)

( * ) Notice: Subject to any disclaimer, the term of this patent is extended or adjusted under 35 U.S.C. 154(b) by 483 days.

(21) Appl. No.: 13/556,933

(22) Filed: Jul. 24, 2012

(51) Int. Cl.
*G06T 17/00* (2006.01)
*G06T 11/60* (2006.01)
*G06T 3/00* (2006.01)
*G06F 17/30* (2006.01)
*G06F 3/0484* (2013.01)

(52) U.S. Cl.
CPC ............ *G06T 11/60* (2013.01); *G06F 3/04845* (2013.01); *G06F 17/30268* (2013.01); *G06T 3/0025* (2013.01); *G06T 2203/04805* (2013.01)

(58) Field of Classification Search
CPC ..................... G06F 17/30265–17/30268; G06F 2203/04805; G06T 3/0012–3/0025; G06T 11/60
USPC ................................ 345/428, 642, 660–671
See application file for complete search history.

(56) References Cited

U.S. PATENT DOCUMENTS

| | | | |
|---|---|---|---|
| 7,075,512 B1 * | 7/2006 | Fabre et al. | 345/156 |
| 7,298,382 B1 * | 11/2007 | Tanaguchi et al. | 345/619 |
| 7,870,130 B2 | 1/2011 | Banerjee et al. | |
| 7,945,653 B2 * | 5/2011 | Zuckerberg et al. | 709/223 |
| 7,970,763 B2 | 6/2011 | Russo | |
| 8,050,498 B2 * | 11/2011 | Wilensky et al. | 382/173 |
| 2003/0099411 A1 * | 5/2003 | Kokemohr | 382/309 |
| 2008/0219493 A1 | 9/2008 | Tadmor | |
| 2011/0158558 A1 | 6/2011 | Zhao et al. | |
| 2011/0167081 A1 | 7/2011 | Kosaka et al. | |
| 2012/0007866 A1 * | 1/2012 | Tahan | 345/428 |

* cited by examiner

*Primary Examiner* — Charles Tseng
(74) *Attorney, Agent, or Firm* — IP Spring

(57) ABSTRACT

Methods and systems for highlighting portions of digital images. In one aspect, a digital image including an object is received. A user selection of a portion of the digital image including at least a portion of the object is received, and the selected portion of the digital image is highlighted. User selected tagging information associated with the selected portion of the digital image is received and transmitted to a computing system.

19 Claims, 8 Drawing Sheets

ADJUSTING A DIGITAL IMAGE CHARACTERISTIC OF AN OBJECT IN A DIGITAL IMAGE

BACKGROUND

The present disclosure relates generally to online photo management. Online social networking websites, online photo sharing websites, and other online services websites allow users to upload, manage, and view their digital images, as well as view digital images of others. Users typically tag digital images with keywords that describe those digital images. For example, a digital image illustrating a sunset can have a tag "beach vacation 2011". In another example, a digital image of an Eiffel Tower in Paris can have a tag "Eiffel Tower".

Image tags can also be used to identify people shown in the digital images. Typically to tag a person in a digital image, a user needs to place a mouse cursor over that person's face, which would in turn draw a rectangle (which is not part of the photo) over the face. Once the rectangle is drawn around the person's face, the user can enter the person's name.

SUMMARY

One approach to highlighting and tagging digital images is a computer-implemented method. The method includes receiving, over a network from a computing system, digital image data associated with a digital image. The digital image includes an object. A resolution associated with the digital image has a first resolution value. A data storage of the computing system stores personal data associated with users. The personal data for each user including relationship data with other users. The method further includes displaying the received digital image on a display of the user computing device. The method further includes receiving a user selection of a portion of the digital image. The selected portion of the digital image includes at least a portion of the object. The method further includes displaying the received digital image on the display in response to receiving the user selection of the portion of the digital image. A resolution value associated with the selected portion of the displayed image is adjusted to a higher resolution value than the first resolution value. A resolution value associated with a second portion of the displayed digital image not including the selected portion is adjusted to a lower resolution value than the first resolution value. The method further includes receiving user selected tagging information associated with the selected portion of the digital image. The tagging information describes the portion of the digital image. The method further includes transmitting the tagging information to the computing system.

Another approach to highlighting and tagging digital images is another computer-implemented method. The method includes receiving, over a network, from a computing system, digital image data associated with a digital image. The digital image includes an object. The method further includes displaying the received digital image on a display of the user computing device. The method further includes receiving a user selection of a portion of the digital image. The selected portion of the digital image includes at least a portion of the object. The method further includes adjusting a digital image characteristic associated with the portion of the digital image associated with the object. The method further includes receiving user selected tagging information associated with the selected portion of the digital image. The tagging information describes the portion of the digital image. The method further includes transmitting the tagging information to the computing system.

Another approach to highlighting and tagging digital images is a system. The system comprising at least one computing device operably coupled to at least one memory and configured to receive, over a network, from a computing system digital image data associated with a digital image, the digital image including an object. The computing device is further configured to display the received digital image on a display of the computing device. The computing device is further configured to receive a user selection of a portion of the digital image. The selected portion of the digital image includes at least a portion of the object. The computing device is further configured to adjust a digital image characteristic associated with the portion of the digital image associated with the object. The computing device is further configured to receive user selected tagging information associated with the selected portion of the digital image, wherein the tagging information describes the portion of the digital image. The computing device is further configured to transmit the tagging information to the computing system.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

Like reference numbers and designations in the various drawings indicate like elements.

DETAILED DESCRIPTION

Users of online social networking sites, online photo management sites, and other online systems frequently upload and view photos as well as view photos uploaded by other users. One or more embodiments may provide for a less time-consuming method of tagging a digital image, and/or a method which does not require drawing rectangles which are not part of the digital image. In these embodiments, users can tag photos with names of people shown in the photos by selecting a portion of a digital image by performing a "mouse over" the person's face (i.e., placing a cursor over a person's face). The portion of the photo that is selected by the user may be visually enhanced by changing the resolution or another photo characteristic of the selected portion of the photo and/ or the rest of the photo. For example, the resolution of the portion of the photo showing the face of the selected person is increased, while the resolution associated with the rest of the photo is decreased. In some embodiments, sub-images are pre-computed for each object shown in the digital image and can include objects at higher resolution. A sub-image containing the object of interest to the user can be blended over the original digital image. The user's attention is thus directed to the portion of the photo that stands out. The user can then tag or label the visually enhanced face.

Users of online search engines can perform digital image searches by entering keywords of interest using an online search engine website. In response to the image search request, the online search engine website determines and displays a set of digital images related to the keyword search. Each digital image in the set of determined digital images includes at least one digital image portion that relates to the search request. That portion of each digital image is visually enhanced or highlighted in relation to the rest of the digital image. For example, an online user could run a search on a web search engine website for a "Jones classic purse". The online search engine website would generate a list of digital images that include Jones handbags, and display the generated digital images emphasizing the portions of the digital images showing the searched handbag. To emphasize digital image portions, various digital image characteristics can be adjusted including resolution, contrast, brightness, colors, etc.

Although the various examples provided in the present disclosure are directed towards online systems (e.g., online social networking website) capable of photo management, as well as online search engines that return digital images related to search requests, the disclosed methods can be used by any other types of systems in order to facilitate communication between a website and one or more user device.

Figure 1:
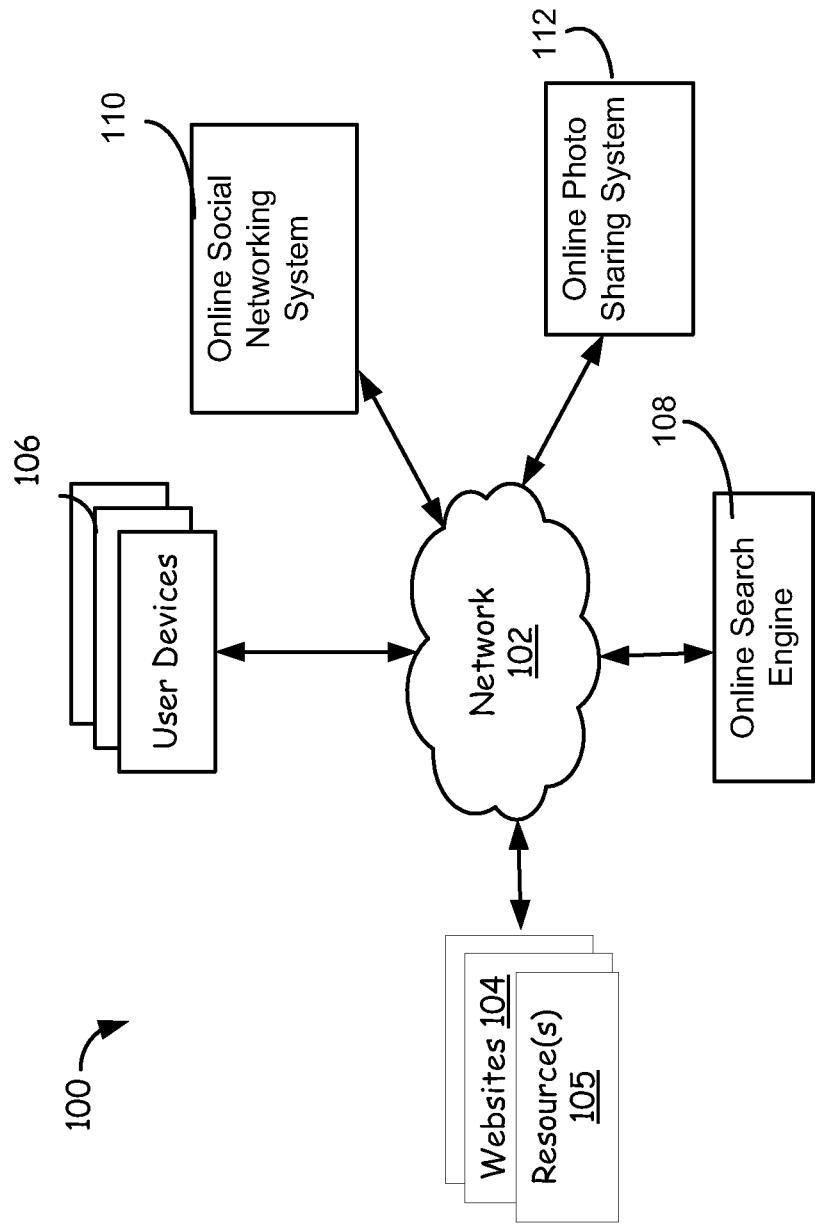
FIG. 1 illustrates a block diagram of an example environment in which user devices utilize photo management services and search engine services of online systems in accordance with an illustrative embodiment.

FIG. 1 is a block diagram of an example environment 100 in which user devices 106 utilize photo management services and search engine services of online systems. The example environment 100 includes a network 102, such as a local area network (LAN), a wide area network (WAN), a wireless network, the Internet, a cellular network, a radio network, a satellite network, or a combination thereof. The network 102 connects websites 104, user devices 106, an online search engine 106, an online social networking system 110, and an online photo sharing system 112. The environment 100 may include any number of websites 104, user devices 106, and various online systems providing online services to the user devices 106.

Each website 104 includes one or more resources 105 associated with a domain name and hosted by one or more servers. An example website is a collection of web pages formatted in hypertext markup language (HTML) that can contain text, images, multimedia content, and programming elements, such as scripts.

The resource 105 is any data that can be provided over the network 102. The resource 105 is identified by a resource address that is associated with the resource 105, such as a URL. Resources 105 can include web pages, word processing documents, portable document format (PDF) documents, images, video, programming elements, interactive content, and feed sources, to name only a few. Resources 105 can include content, such as words, phrases, images and sounds, that may include embedded information (such as meta-information in hyperlinks) and/or embedded instructions. Embedded instructions can include code that is executed at a user's device, such as in a web browser. Code can be written in languages, such as, JavaScript® or ECMAScript®.

A user device 106 is an electronic device that is under the control of a user. The user device 106 is configured to request and receive resources 105 over the network 102. Example user devices 106 include personal computers, mobile communication devices (e.g., cellular telephone, smart phone, etc.), and other computing devices (e.g., having a processor and memory or other type of computer-readable medium) that can send and receive data over the network 102. In some embodiments, the user devices 106 may include a user application, such as a web browser, to facilitate the sending and receiving of data over the network 102. In other embodiments, the user devices 106 may include an application (e.g., phone application) for communication with online systems (e.g., systems 110 and 112).

The user devices 106 can request resources 105 from a website 104. In turn, data representing the resource 105 can be provided to the user device 106 for presentation by the user device 106 (e.g., on an electronic display, as an audible sound via a speaker, or a combination thereof).

The online social networking system 110 can include a website 104 enabling users to communicate with one another by sending messages, sharing photos, etc. System 110 may be configured to store relationships between users, such as "friends," "family," "work friends," etc., and to limit the sharing of messages, photos and other content based on these pre-stored relationships. Using the system 110, users can create and share albums of photos with some or all of their friends. For example, users can select people to share particular content with (e.g., select certain friends to share photos with).

The online photos sharing system 112 can also include a website 104 that allows users to share photos. Using the resources 105 associated with the website 104 of the online social networking system 110 or the online photo sharing system 112, users can upload, view, delete, edit, send to printer, "auto-fix," and otherwise manage photos. Users can tag digital images with tags describing contents of the digital images. For example, a tag can include a name of a person displayed in the digital image and can further comprise a hyperlink to the person's profile page or profile data.

When the user device 106 sends a query to the online search engine 108 requesting digital images related to the keywords provided by the user in the query, the online search engine 108 determines a set of digital images to display to the user. As discussed with respect to FIG. 3, the determined set of digital images may be displayed to the user with portions of each digital image that are related to the search request being highlighted so as to visually emphasize those portions to the user.

Figure 2A:
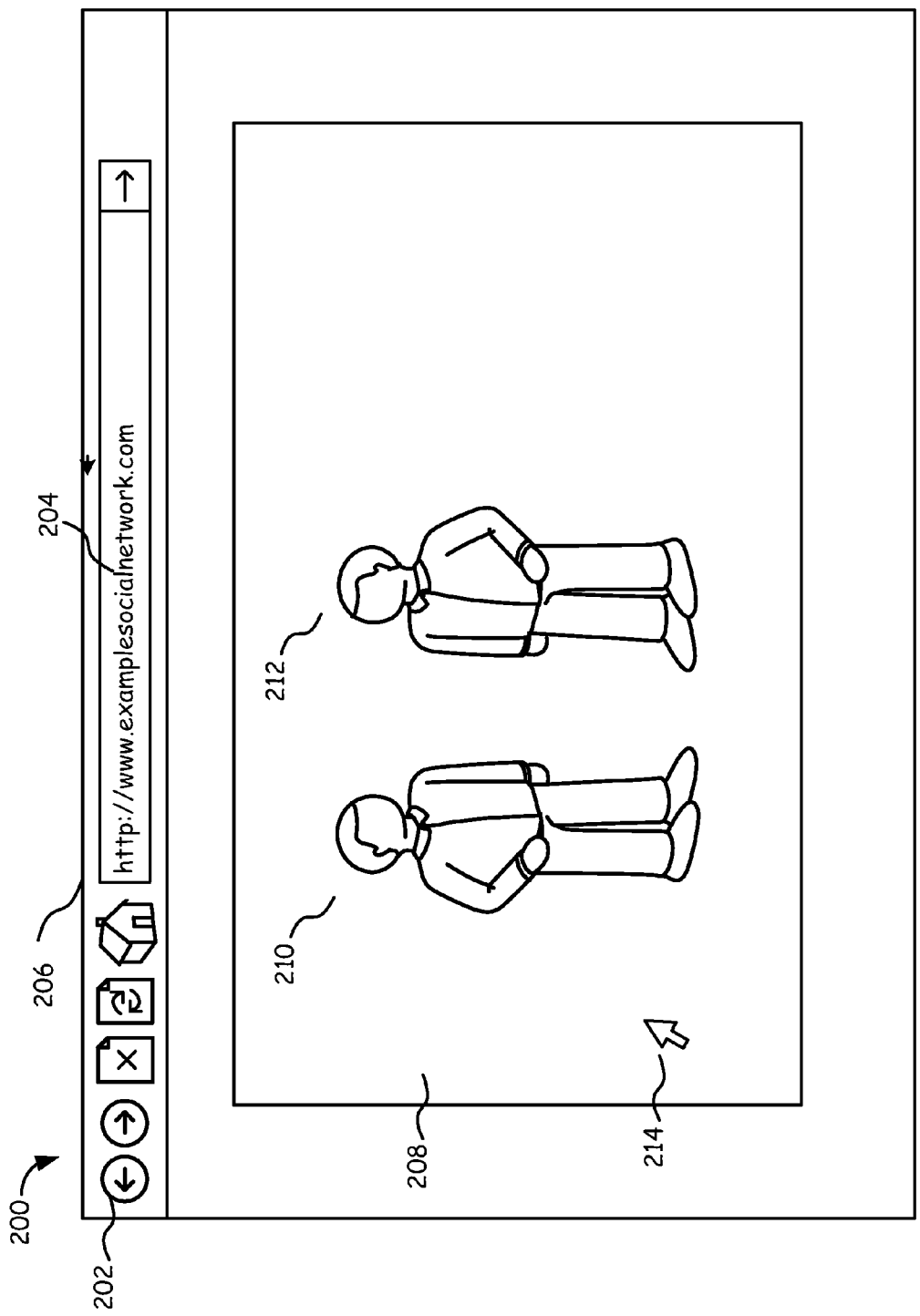
FIGS. 2A-C illustrate user interfaces for highlighting and photo tagging objects in photos in accordance with an illustrative embodiment.
Figure 2B:
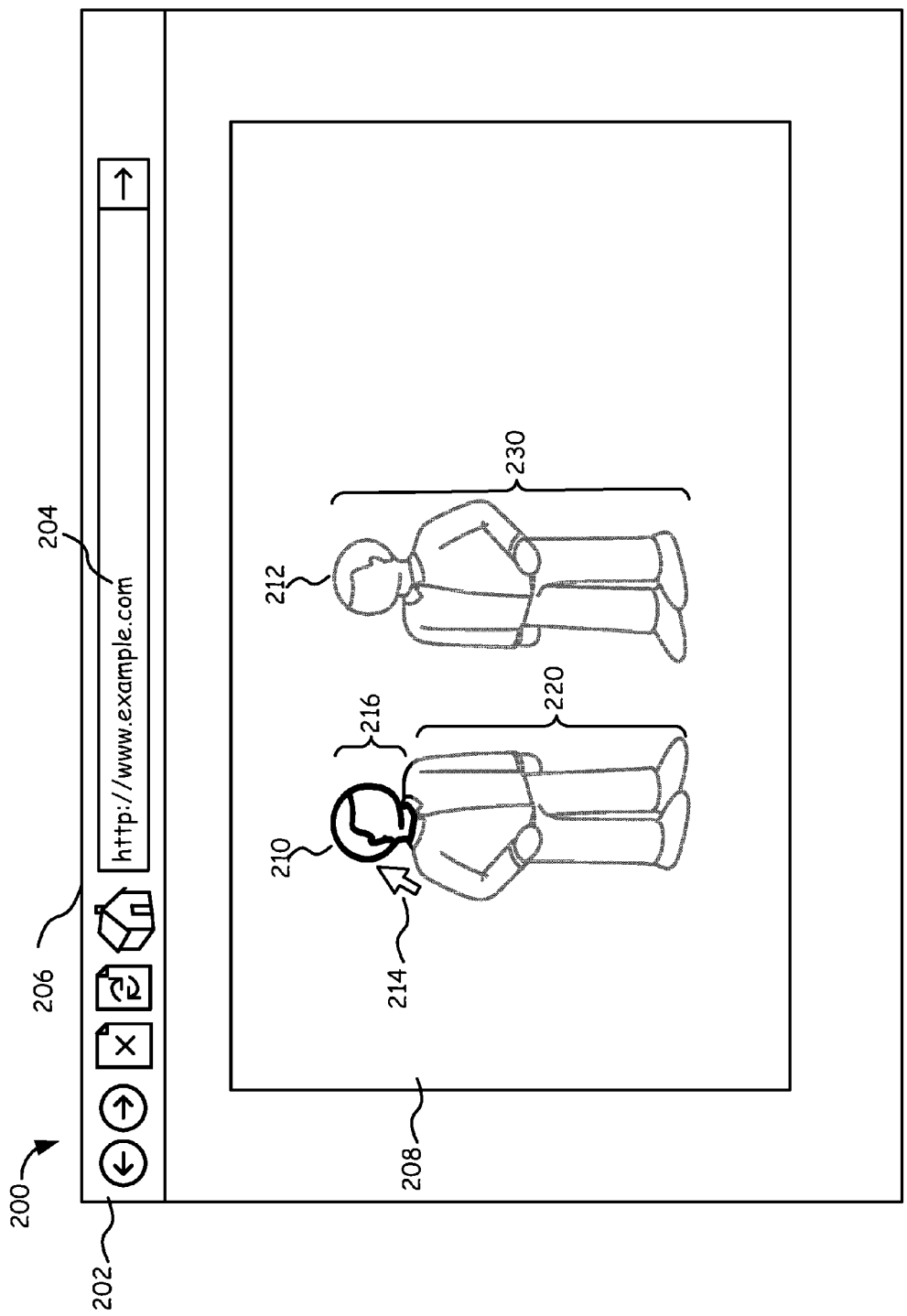
Figure 2C:
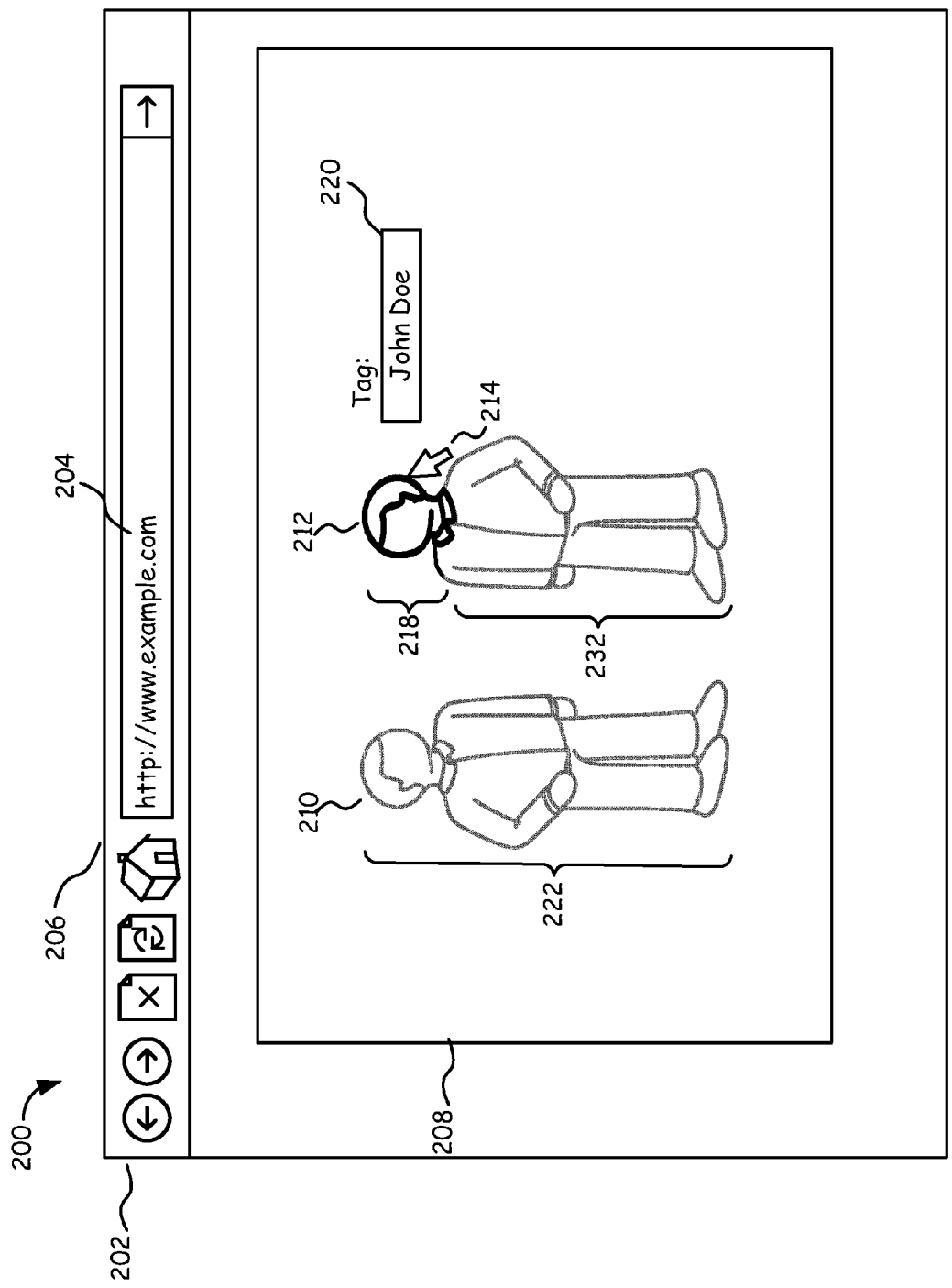

As shown in FIGS. 2A-2C, one or more processors in communication with a display 200 may execute a software application, such as a web browser 202 (e.g., display 200 is part of a user device 106), in accordance with an illustrative embodiment. The web browser 202 operates by receiving input of a resource name or network address into a field 204, such as a web address, from an input device (e.g., a pointing device, a keyboard, a touchscreen, etc.). In response, one or more processors associated with the user device 106 and executing the web browser 202 may request data over a network (e.g., the Internet, an intranet, etc.) from a content source corresponding to the resource name or network address. The content source may provide webpage data and/or other data to the user device which is used to cause visual indicia to be displayed to the user.

In general, webpage data may include photos, text, hyperlinks, layout information, and other data. In some implementations, webpage data may be one or more files in a markup language, such as the hypertext markup language (HTML), extensible HTML (XHTML), extensible markup language (XML), or any other markup language. For example, the webpage data in FIGS. 2A-C may include a file, "examplesocialnetwork.html" provided by the website, "www.examplesocialnetwork.com." The webpage data may include data that specifies where indicia appear on the webpage 206, such as a digital image 208 or other visual objects. In some implementations, the webpage data may also include additional information used by the user device to retrieve additional indicia displayed on webpage 206. For example, the file, "examplesocialnetwork.html," may include network address information for the location of the digital image 208.

The web browser 202 providing display data to the display 200 may include a number of navigational controls associated with the webpage 206. For example, the web browser 202 may include the ability to go back or forward to other webpages using inputs 204 (e.g., a back button, a forward button, etc.). In various implementations, inputs 204 may retrieve webpage data again from a content source over a network or may retrieve previously displayed webpage data from a local cache.

The webpage 206 can be associated with the online social networking system 110, the online photo sharing system 112, or any other online system enabling the user to view and manage digital images. The webpage 206 displays various data content to the user. In particular, the webpage 206 displays the digital image 208 showing two objects 210 and 212. As shown, a cursor 214 is not pointing at either of the objects. In some embodiments, the webpage 206 enables the user to edit the digital image 208 by performing cropping, auto-fixing, etc. If other users leave comments regarding contents of the digital image 208, the webpage 208 can display those comments (e.g., below the digital image 208). The user can share the digital image 208 with all or some of the people listed in the user's contact relationship list. The digital image 208 can be part of a photo album created by the user or another user of the system 110.

In FIG. 2B, the webpage 206 illustrates the user placing the cursor 214 over (e.g., by way of a "mouse over", clicking on, tapping on using a touch screen, etc.) one of the objects 210. As shown, the object 210 is a person. When the user places a cursor over the person shown in the digital image, a face portion 216 of the person in the digital image 208 is identified as a face (e.g., using a facial recognition application or algorithm). The recognized face portion 216 is then rendered in such a way as to emphasize the portion 216 to the user.

In some embodiments, the face portion 216 can be highlighted by increasing the resolution associated with the face portion 216 of the digital image 208, and/or decreasing the resolution of the rest of the digital image 208 (e.g., portions 220 and 230). Accordingly, the face portion 216 of the object 210 is emphasized to the user. In other embodiments, if the face portion 216 is not recognized, the user can manually select an "object" in the digital image 208 or portion thereof.

In FIG. 2C, the webpage 206 illustrates tagging of the object 212. As shown, the cursor 214 is placed over or near the object 212 which causes highlighting of the portion 218 of the object 212. In this example, the object 212 is a person, and the face portion 218 of this person is highlighted by increasing resolution or another digital image characteristic and/or decreasing resolution or another digital image characteristic of the rest of the digital image 208 (e.g., portions 222 and 232) or a portion less than the whole digital image surrounding face portion 218.

A tagging input field 220 is provided to tag the highlighted person 212. The user can enter the person's name into the tagging input field 220. Once the person is tagged with their name, the tag can be displayed in the digital image 208. Similarly, the object 212 can be tagged with the person's name. Accordingly, the webpage 206 provides the user with an easy way of tagging objects shown in the digital images. In some embodiments, digital images can be tagged with descriptions of objects shown including landmarks, places, etc.

The tagging information entered by the users is transmitted to the system managing the webpage 206 (e.g., a webpage associated with the online social networking system 110) for processing and storage. When the user subsequently logs into the system and views the digital image 208, it will display the entered digital image tagging information. Similarly, the tagging information will be displayed to other users who have access to the digital image 208. In some embodiments, when a user is tagged in another user's digital image, a post can be automatically placed on a user's profile webpage indicating that the user has been tagged in a digital image by another user. The tags on the digital image can be in the form of a text, or text with a hyperlink to the profile of a user depicted in the digital image.

Figure 3:
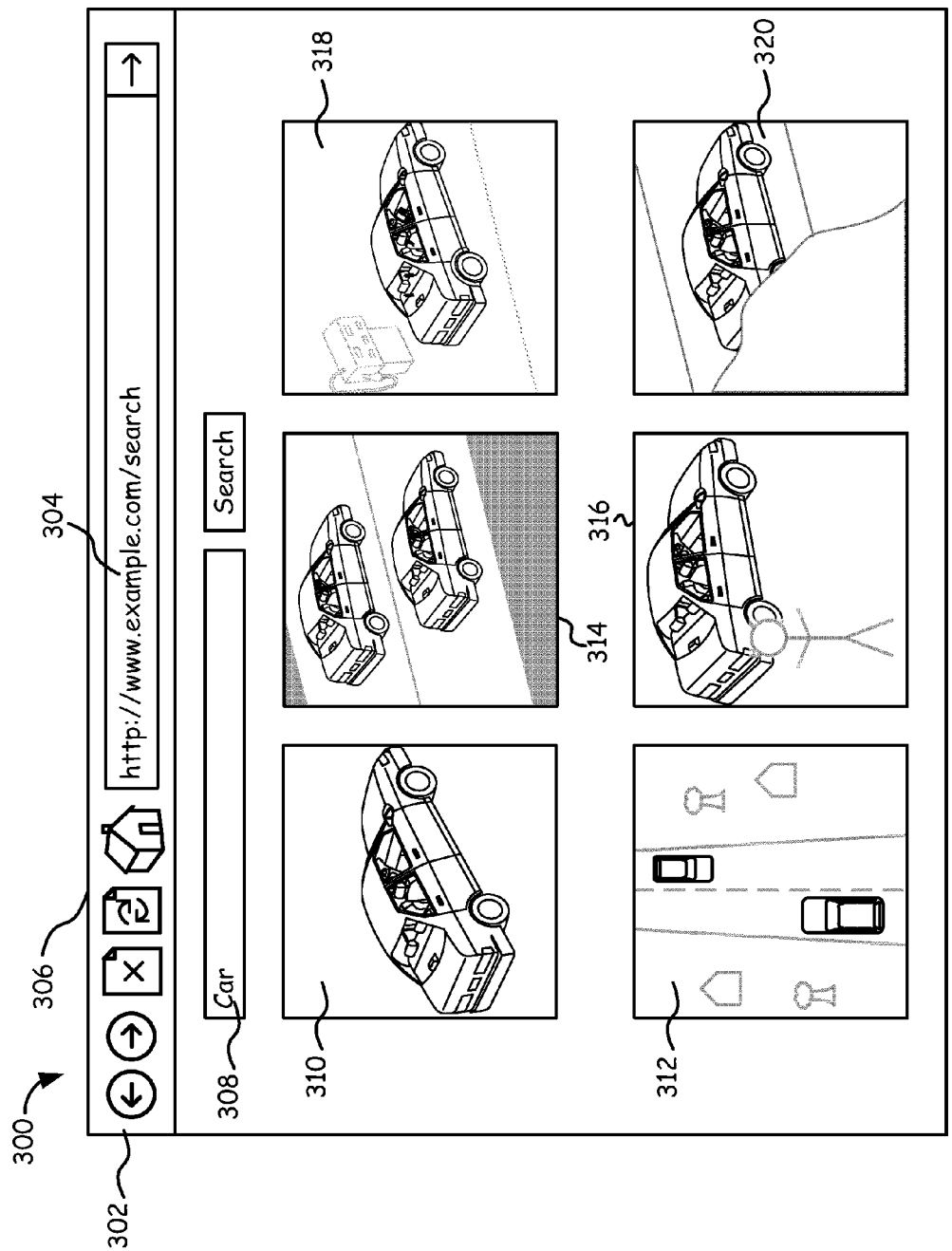
FIG. 3 illustrates highlighting of objects in digital images shown in online search results in accordance with an illustrative embodiment.

FIG. 3 illustrates a user interface display 300 for performing digital image searches using an online search engine (e.g., the online search engine 108), in accordance with an illustrative implementation. A web browser 302 operates by receiving input of a resource name or network address into a field 304, such as a web address, from an input device (e.g., a pointing device, a keyboard, a touchscreen, etc.). In response, one or more processors associated with the user device 106 and executing the web browser 302 may request data over a network (e.g., the Internet, an intranet, etc.) from a content source corresponding to the resource name or network address (i.e., http://www.example.com/search). As shown, the content source is an online search system which provides webpage data to the user device which is used to cause visual indicia to be displayed to the user.

As illustrated in FIG. 3, the user entered a keyword "Car" into a search input field 308. The online search engine 108 returned search results including six digital images 310-320. Using digital image recognition algorithms or systems, portions of the digital image displaying the searched item are recognized. As shown, in each digital image 310-320, the recognized portions that display a car are highlighted in order to draw the user's attention to that portion of the digital image.

In some embodiments, the highlighting is done by changing one or more digital image characteristics (e.g., resolution) of the portion of the digital image that relates to the search keywords and/or one or more digital image characteristics associated with the rest of the digital image. Accordingly, the portions of the digital images most relevant to the search are emphasized to the user, so that the user can easily determine which digital images are of interest to them.

Figure 4:
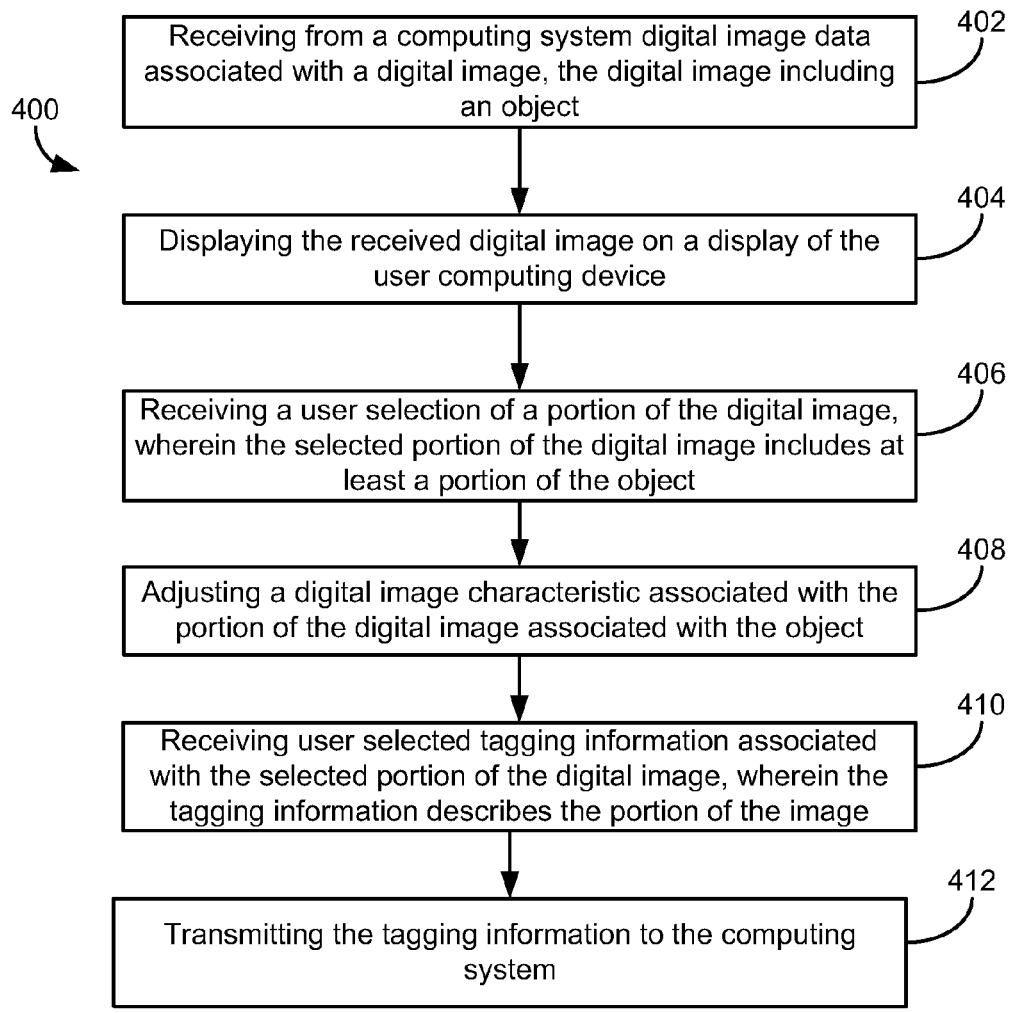
FIG. 4 is a flow diagram of an example process for highlighting and tagging a portion of an digital image in accordance with an illustrative embodiment.

FIG. 4 is a flow diagram of a process 400 for highlighting and tagging a portion of an digital image, in accordance with an illustrative embodiment. The process 400 can be implemented on a user computing device (e.g., smart mobile phone). In one embodiment, the process 400 is encoded on a computer-readable medium that contains instructions that, when executed by a computing device, cause the computing device to perform operations of the process 400.

The process 400 includes receiving (402) digital image data associated with a digital image, the digital image including an object. The digital image can include any number of objects, and have multiple digital image characteristics. Digital images can include any type of objects including people, animals, landmarks, locations, a portion thereof (e.g., a face), etc. The process 400 includes displaying (404) the received digital image on a display of the user computing device. For example, as illustrated in FIGS. 2A-C, an exemplary digital image is shown to the user displaying two objects.

The process 400 includes receiving (404) a user selection of a portion of the digital image. The selected portion of the digital image can include at least a portion of the object. In some embodiments, the user can select a portion of the digital image by placing an indicator (e.g. a mouse cursor) showing a position on a computer display over the object. In these embodiments, the user selects the digital image portion by placing a mouse cursor over it. For example, the user can select a portion of a digital image by selecting an object shown in the digital image. FIGS. 2B and 2C illustrate the user placing their mouse cursor over or near objects 210 and 212. In other embodiments, the user selects the object by clicking on the object.

At block 406, a digital image characteristic associated with the portion of the digital image associated with the object is adjusted (406). The digital image characteristics can include digital image resolution, digital image color, digital image contrast, digital image brightness, or other digital image characteristics. In some embodiments, a digital image characteristic associated with the selected portion of the digital image can be adjusted to a different digital image characteristic value. For example, the selected portion of the digital image can be adjusted to have a higher resolution value than an original resolution value of the digital image. In this example, a portion of the digital image not including the selected portion can be adjusted to have a lower resolution than the original resolution value. In FIG. 2B, the face portion 216 of the person on the left is highlighted by increasing the resolution of the face portion 216 and decreasing the resolution of the rest of the digital image (e.g., digital image portions 220, and 230). Similarly, in FIG. 2C, the face portion 218 of the person rendered on the right is highlighted by increasing the resolution of the face portion 218 and decreasing the resolution of the rest of the digital image (e.g., digital image portions 222, and 232). The characteristic value can be increased or decreased by at least a predetermined amount, such as at least 2%, at least 5%, at least 10%, at least 25%, etc. In another example, the resolution of the rest of the digital image can be lowered, while keeping the resolution of the object of interest the same.

The digital image characteristic adjustment can include changing the value of one or more characteristics associated with the portion of the digital image including the object of interest. The adjustment step can include adjusting one or more digital image characteristics associated with a portion of the digital image not displaying the object (e.g., car) of interest. A value of a particular digital image characteristics can be adjusted by a predetermined amount. For example, the resolution digital image characteristic can be increased by at least 20% or decreased by at least 20%. The predetermined adjustment amount for each characteristic can be automatically determined and intermittently updated by the system, or manually entered by an administrator of the system.

In some embodiments, the digital image characteristics adjusted for the determined portion of the digital image may be the same or different than the digital image characteristics adjusted for the rest of the digital image. For example, the resolution of the determined portion of the digital image is increased, while the resolution of the rest of the digital image is decreased. In another example, resolution and brightness characteristics of the determined portion of the digital image are increased or enhanced, while the brightness and contrast characteristics of the rest of the digital image are decreased.

In other embodiments, instead of adjusting digital image characteristics in order to emphasize to the user a portion of the image, a portion of the image including an object of interest (e.g., a face) can be replaced with a sub-image displaying the object. For example, the sub-image may display the object at a higher resolution than the rest of the digital image. In these embodiments, the highlighted sub-image is blended over the original digital image.

The process 400 includes receiving (410) user selected tagging information associated with the selected portion of the digital image. FIG. 2C illustrates the user tagging the person 212 shown in the digital image with the person's name. Accordingly, the user can easily tag highlighted portions of digital images (e.g., digital image portions 216, 218), which advantageously simplifies the process of tagging digital images using an online system. At block 412, the tagging information is transmitted to the computing system for storage and/or further processing. In some embodiments, other users having access to the digital image can view the tagging information selected by the user.

In some embodiments, the online system (e.g., online social networking system 110, online photo sharing system 112, or another system) can perform initial offline processing of the digital image. For example, the initial processing of the digital image can take place when the digital image is received by the online system. During the initial processing of the digital image, boundaries are computed and stored at various resolutions for faces and common objects, using image detection techniques. For example, common objects can include items (e.g., cars) whose brand is recognized, landmarks (e.g., Eiffel tower), etc. Faces or common objects that are too small to be used for tagging can be discarded for purposes of computing and storing them at various resolutions. The boundaries associated with the digital image can be stored at various resolutions. An bounding box (elliptical or circular bounding box) for the object is stored by the online system.

In some embodiments, for each object in the digital image, a separate enclosing sub-image, with the object highlighted, and the rest of the digital image remaining the same as the original digital image is computed by the online system. When the objects do not overlap, a separate sub-image is calculated for each object. For example, if a digital image include five objects, then five sub-images are computed, with each sub-image highlighting a different object. In these embodiments, when the user hovers their cursor over a region containing an object, the user interface displaying the digital image can blend in the highlighted sub-image over the original digital image.

In other embodiments, a web browser utilized by the user to view digital images may have hardware and/or software support for programmable shader programs. In these embodiments, pre-computation of sub-images described above is not necessary since highlighting is performed in real-time or in real-time using a programmable shader program supported by the web browser or other hardware graphics support, given points and radii of interest, or bounding boxes. Depending on the distance from the center of attraction, and radii of interest, a shader program is used to highlight the image. In other embodiments, with appropriate hardware graphics support, a portion of the image is highlighted at any point of the digital image that the user clicks. If the web browser or the user device are equipped with hardware graphics support, an appropriate portion of the digital image is highlighted at any point clicked by the user. Alternatively, if the digital image is encoded in a multi-resolution manner, digital image highlighting can be performed without the hardware graphics support.

Figure 5:
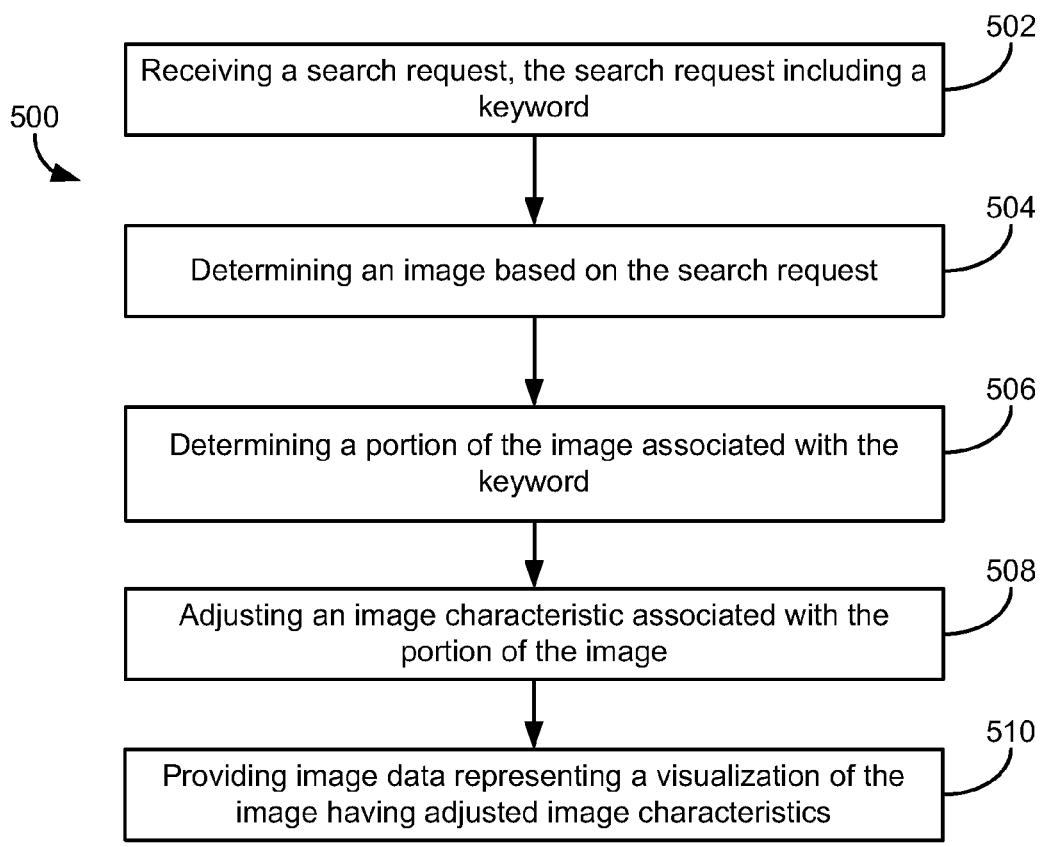
FIG. 5 is a flow diagram of an example process for highlighting objects in search results digital images in accordance with an illustrative embodiment.

FIG. 5 is a flow diagram of a process 500 for highlighting objects in search results images, in accordance with an illustrative embodiment. The process 500 can be implemented on a computing device. In one embodiment, the process 500 is encoded on a computer-readable medium that contains instructions that, when executed by a computing device, cause the computing device to perform operations of the process 500.

The process 500 includes receiving (502) a search request including one or more keywords from a user device 106. The user can enter the keywords using the online search engine 108 or another online search system. The online search engine 108 determines (504) an image based on the search request. The determined image is related to the keywords entered by the user. For example, as shown in FIG. 3, when the user a keyword "Car", six images 310-320 are determined that include a car.

At 506, a portion of the digital image associated with the keyword is determined (506). For example, in FIG. 3, a portion of the digital image including a car in the digital image 320 is determined. An image characteristic associated with the determined portion of the digital image is adjusted (508). In some embodiments, digital image characteristics that are adjusted in block 508 can include digital image resolution, digital image color, digital image contrast, and/or digital image brightness. In these embodiments, values associated with adjusted digital image characteristics are updated (e.g., by a predetermined amount) as described with respect to step 406 in the process 400.

At 510, digital image data representing a visualization of the digital image having adjusted digital image characteristics is provided (510) to the user device 106 for display to the user. Accordingly, the user is shown a digital image with a portion of the digital image that is relevant to the search request highlighted or emphasized with respect to the rest of the digital image such that the user's attention is directed to the object of interest.

Figure 6:
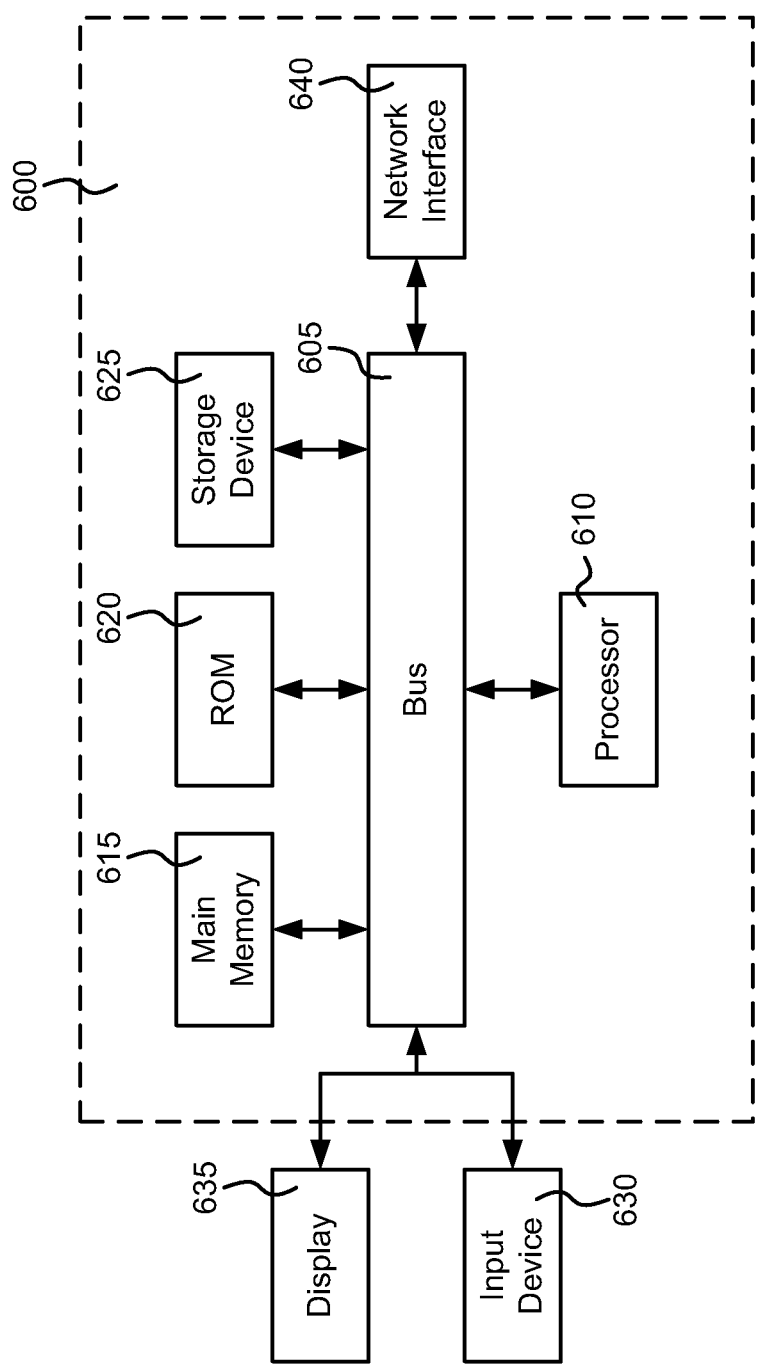
FIG. 6 is a block diagram of a computer system in accordance with an illustrative embodiment.

FIG. 6 is a block diagram of a computer system in accordance with an illustrative implementation. The computer system or computing device 600 can be used to implement the user devices 106, the online search engine 108, the online social networking system 110, and/or the online photo sharing system 112, etc. The computing system 600 includes a bus 605 or other communication component for communicating information and a processor 610 or processing circuit coupled to the bus 605 for processing information. The computing system 600 can also include one or more processors 610 or processing circuits coupled to the bus for processing information. The computing system 600 also includes main memory 615, such as a random access memory (RAM) or other dynamic storage device, coupled to the bus 605 for storing information, and instructions to be executed by the processor 410. Main memory 615 can also be used for storing position information, temporary variables, or other intermediate information during execution of instructions by the processor 610. The computing system 600 may further include a read only memory (ROM) 610 or other static storage device coupled to the bus 605 for storing static information and instructions for the processor 610. A storage device 625, such as a solid state device, magnetic disk or optical disk, is coupled to the bus 605 for persistently storing information and instructions.

The computing system 600 may be coupled via the bus 605 to a display 635, such as a liquid crystal display, or active matrix display, for displaying information to a user. An input device 630, such as a keyboard including alphanumeric and other keys, may be coupled to the bus 605 for communicating information and command selections to the processor 610. In another implementation, the input device 630 has a touch screen display 635. The input device 630 can include a cursor control, such as a mouse, a trackball, or cursor direction keys, for communicating direction information and command selections to the processor 610 and for controlling cursor movement on the display 635.

According to various implementations, the processes described herein can be implemented by the computing system 600 in response to the processor 610 executing an arrangement of instructions contained in main memory 615. Such instructions can be read into main memory 615 from another computer-readable medium, such as the storage device 625. Execution of the arrangement of instructions contained in main memory 615 causes the computing system 600 to perform the illustrative processes described herein. One or more processors in a multi-processing arrangement may also be employed to execute the instructions contained in main memory 615. In alternative implementations, hard-wired circuitry may be used in place of or in combination with software instructions to effect illustrative implementations. Thus, implementations are not limited to any specific combination of hardware circuitry and software.

Although an example computing system has been described in FIG. 6, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, i.e., one or more modules of computer program instructions, encoded on one or more computer storage media for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be performed by a data processing apparatus on data stored on one or more computer-readable storage devices or received from other sources.

The term "data processing apparatus" or "computing device" or "processing circuit" encompasses all kinds of apparatus, devices, and machines for processing data, including by way of example a programmable processor, a computer, a system on a chip, or multiple ones, a portion of a programmed processor, or combinations of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system comprising:
  one or more processors; and
  logic encoded in one or more tangible media for execution by the one or more processors and when executed operable to perform operations comprising:
    receiving, over a network from a user device, digital image data associated with a digital image, the digital image including an object, wherein a resolution associated with the digital image has a first resolution value, and wherein a data storage of the system stores relationship data for each user;
    transmitting instructions to cause a display of the received digital image on a display of the user device;
    receiving a user selection of a first portion of the digital image, the first portion of the digital image including at least a portion of the object;
    in response to receiving the user selection of the first portion of the digital image, transmitting instructions to cause a display of the received digital image on the display, wherein a resolution value associated with the first portion of the displayed image is adjusted to a higher resolution value than the first resolution value, and a resolution value associated with a second portion of the displayed digital image not including the first portion is adjusted to a lower resolution value than the first resolution value;

receiving user selected tagging information associated with the first portion of the digital image, wherein the tagging information includes one or more tags corresponding to the first portion of the digital image;

receiving a search request including one or more keywords;

determining the first portion of the digital image based on the one or more keywords, wherein the one or more keywords correspond to the one or more tags; and transmitting instructions to cause a display of the digital image including the adjusted digital image resolutions of the first portion and the second portion of the digital image in response to receiving the search request.

2. A computer-implemented method of tagging and searching portions of digital images displayed on a user device, the method comprising:

receiving, over a network, from a user device, digital image data associated with a digital image, the digital image including an object, and wherein a digital image resolution associated with the digital image has an image resolution value;

transmitting instructions to cause a display of the received digital image on a display of the user device;

receiving a user selection of a first portion of the digital image, wherein the first portion of the digital image includes at least a portion of the object;

receiving user selected tagging information associated with the first portion of the digital image, wherein the tagging information includes one or more tags corresponding to the first portion of the digital image;

receiving a search request including one or more keywords;

determining the first portion of the digital image based on the one or more keywords, wherein the one or more keywords correspond to the one or more tags;

adjusting a first digital image resolution associated with the first portion of the digital image that was determined based on the one or more keywords, including adjusting a resolution value associated with the first portion of the displayed image to a higher resolution value than the image resolution value;

adjusting a second digital image resolution associated with a second portion of the digital image not including the first portion of the digital image, including adjusting a resolution value associated with the second portion of the displayed image to a lower resolution value than the image resolution value; and transmitting instructions to cause a display of at least a portion of the digital image including the adjusted one digital image resolutions of the first and second portions of the digital image in response to receiving the search request.

3. The method of claim 2, further comprising:

accessing the tagging information associated with the first portion of the digital image, wherein the tagging information describes the first portion of the digital image that was determined based on the one or more keywords; and transmitting instructions to cause a display of the tagging information with the first portion of the digital image that was determined based on the one or more keywords.

4. The method of claim 2, further comprising adjusting one or more digital image characteristics associated with the first portion of the digital image, wherein the one or more digital image characteristics include at least one of digital image color, digital image contrast, and digital image brightness.

5. The method of claim 2, further comprising:

adjusting values of one or more digital image characteristics associated with the first portion of the digital image; and adjusting values of one or more digital image characteristics associated with the second portion of the digital image, wherein the digital image characteristics associated with the first portion and the second portion include one or more of contrast, brightness, and color.

6. The method of claim 2, wherein adjusting the first digital image resolution associated with the first portion of the digital image includes replacing the first portion of the digital image with a sub-image displaying one or more objects displayed by the first portion, wherein the sub-image includes a higher resolution than the image resolution value, and wherein the sub-image is blended over the digital image.

7. The method of claim 2, further comprising accessing the digital image from an online social networking system storing the relationship data.

8. The method of claim 2, further comprising accessing the digital image from an online photo sharing system storing digital images for a plurality of users, wherein the online photo sharing system provides user interfaces for users to upload, manage and share digital images with other users.

9. The method of claim 2, further comprising:

adjusting a digital image characteristic of the digital image for the first portion of the digital image and not for the second portion of the digital image, wherein the digital image characteristic is different than the digital image resolution of the image.

10. A system comprising:

at least one computing device operably coupled to at least one memory and configured to:

receive, over a network, from a user device, digital image data associated with a digital image, the digital image including an object, and wherein a digital image resolution associated with the digital image has an image resolution value;

transmit instructions to cause a display of the received digital image on a display of the user device;

receive a user selection of a first portion of the digital image, wherein the first portion of the digital image includes at least a portion of the object;

receive user selected tagging information associated with the first portion of the digital image, wherein the tagging information includes one or more tags corresponding to the first portion of the digital image;

receive a search request including one or more keywords;

determine the first portion of the digital image based on the one or more keywords, wherein the one or more keywords correspond to the one or more tags;

adjust a first digital image resolution associated with the first portion of the digital image that was determined based on the one or more keywords, including adjusting a first resolution value associated with the first portion of the displayed image to a higher resolution value than the image resolution value;

adjust a second digital image resolution associated with a second portion of the digital image not including the first portion of the digital image that was determined based on the one or more keywords, wherein the second digital image resolution is adjusted to a second resolution value lower than the image resolution value; and transmit instructions to cause a display of the digital image including the adjusted digital image resolutions of the first portion and the second portion of the digital image in response to receiving the search request.

11. The system of claim 10, the at least one computing device further being configured to adjust one or more additional digital image characteristics associated with the first portion of the digital image.

12. The system of claim 11, the at least one computing device further being configured to adjust at least one additional digital image characteristic associated with the second portion of the digital image not displaying the first portion of the digital image that was determined based on the one or more keywords, wherein the at least one additional digital image characteristic is different than at least one of the one or more additional digital image-characteristics associated with the first portion of the digital image.

13. The system of claim 10, the at least one computing device further being configured to adjust one or more digital image characteristics associated with the first portion of the digital image, wherein the one or more digital image characteristics include digital image color.

14. The system of claim 13, the at least one computing device further being configured to adjust at least one digital image characteristic associated with the second portion of the digital image not displaying the first portion of the digital image that was determined based on the one or more keywords, wherein the digital image characteristic is the same as at least one of the one or more digital image-characteristics associated with the first portion of the digital image.

15. The system of claim 10, the at least one computing device further being configured to adjust one or more digital image characteristics associated with the first portion of the digital image, wherein the one or more digital image characteristics include at least one of digital image contrast and digital image brightness.

16. The system of claim 10, the at least one computing device further being configured to adjust one or more digital image characteristics associated with the first portion of the digital image including increasing a value of the one or more digital image characteristics.

17. The system of claim 10, wherein the second portion of the digital image displays one or more additional objects.

18. The system of claim 10, wherein the at least one computing device configured to adjust the first digital image resolution associated with the first portion of the digital image includes being configured to replace the first portion of the digital image with a sub-image displaying one or more objects displayed by the first portion, wherein the sub-image includes a higher resolution than the image resolution value, and wherein the sub-image is blended over the digital image.

19. A system comprising:
at least one computing device operably coupled to at least one memory and configured to:
access digital image data associated with a digital image, the digital image including an object, and wherein a digital image resolution associated with the digital image has an image resolution value;
display the digital image on a display;
receive a user selection of a first portion of the digital image, wherein the first portion of the digital image includes at least a portion of the object;
receive user selected tagging information associated with the first portion of the digital image, wherein the tagging information includes one or more tags corresponding to the first portion of the digital image;
transmit the tagging information to a server system;
transmit a search request to the server system, wherein the search request includes one or more keywords, wherein the one or more keywords correspond to the one or more tags, and wherein
a first digital image resolution associated with the first portion of the digital image is adjusted to a first resolution value higher than the image resolution value,
and a second digital image resolution associated with a second portion of the digital image not including the first portion of the digital image is adjusted to a second resolution value lower than the image resolution value; and
display the digital image with the adjusted digital image resolutions of the first portion and the second portion of the digital image associated with the one or more keywords in response to the search request.

* * * * *